United States Patent [19]

Mohr

[11] Patent Number: 4,651,433
[45] Date of Patent: Mar. 24, 1987

[54] PRESSURE SENSITIVE LEVELING DEVICE

[76] Inventor: Henry G. Mohr, Rte. 3, Box 197, Carthage, Mo. 64836

[21] Appl. No.: 777,457

[22] Filed: Sep. 18, 1985

[51] Int. Cl.$^4$ .............................................. G01C 5/04
[52] U.S. Cl. ........................................ 33/366; 33/367
[58] Field of Search .................... 33/367, 366, 147 C, 33/377; 73/432 HA, 301

[56] References Cited

U.S. PATENT DOCUMENTS

| | | | |
|---|---|---|---|
| 2,438,758 | 3/1948 | Leach | 33/367 |
| 3,645,135 | 2/1972 | Hadley | 33/367 |
| 3,853,006 | 12/1974 | Lawford | 73/301 |
| 4,368,639 | 1/1983 | Owens | 73/301 |
| 4,375,764 | 3/1983 | Lawford et al. | 73/301 |
| 4,379,367 | 4/1983 | Legris | 33/367 |
| 4,541,285 | 9/1985 | Häfner | 73/301 |

FOREIGN PATENT DOCUMENTS

| | | | |
|---|---|---|---|
| 59-38610 | 3/1984 | Japan | 73/432 HA |
| 964442 | 10/1982 | U.S.S.R. | 33/367 |

Primary Examiner—Willis Little
Attorney, Agent, or Firm—Kokjer, Kircher, Bradley, Wharton, Bowman & Johnson

[57] ABSTRACT

A leveling device includes a first and second pressure cell that are interconnected by lengths of fluid filled, flexible tubing. Each of the pressure cells is associated with a strain gauge for sensing the differential pressure of the fluid between a region associated with each of the tubing lengths. An indicating means associated with the strain gauges indicates, in response to a differential in fluid pressure sensed by the strain gauges, the elevation of either of the pressure cells relative to the position of the other cell. In one form of the invention, provision of a single tubing conduit between the strain gauges reduces the probability of erroneous measurements due to pressure fluctuations within the tubing. In alternate forms of the invention, an agitating means is associated with flexible bellows structure coupled to the tubing so that hysteresis of the fluid is substantially reduced.

11 Claims, 5 Drawing Figures

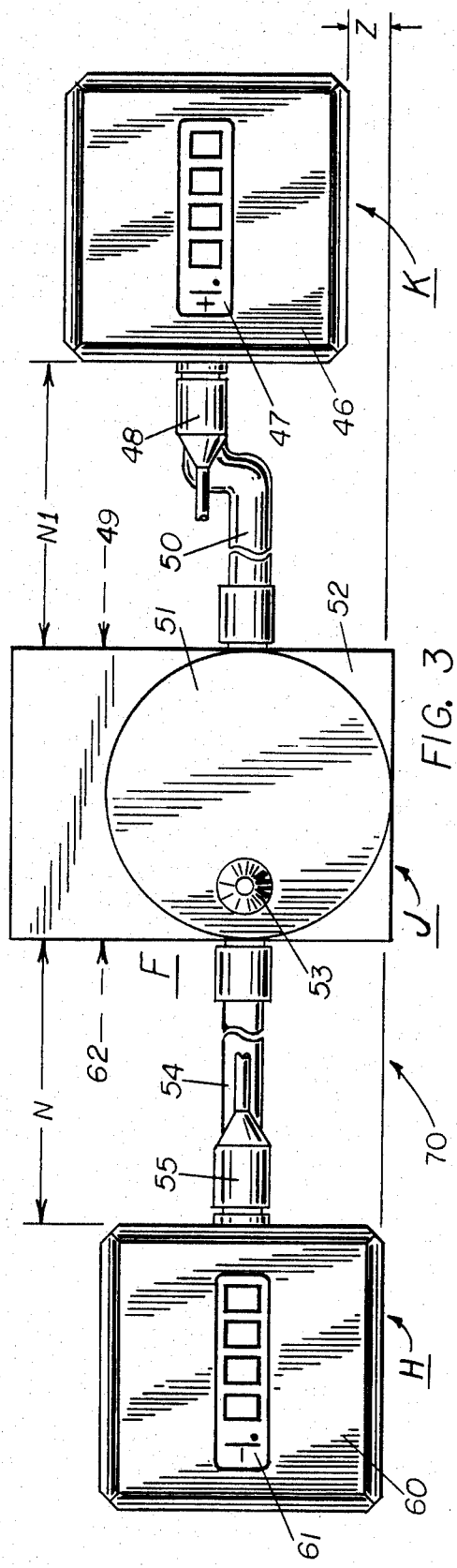
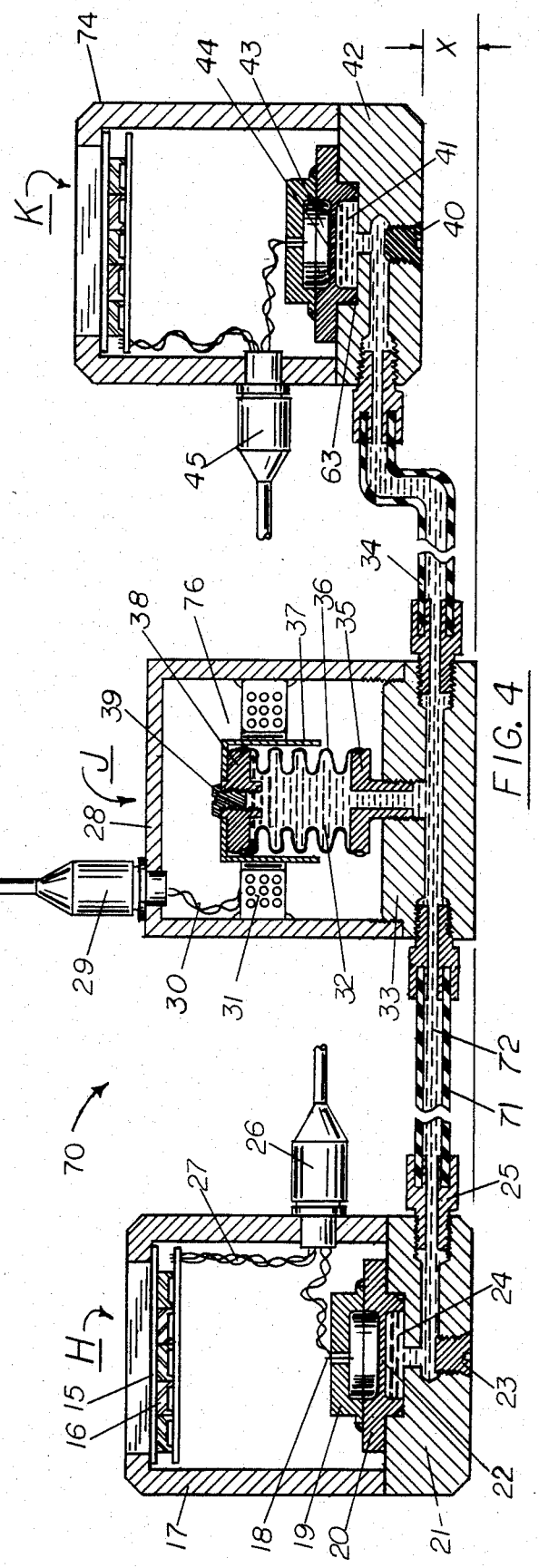

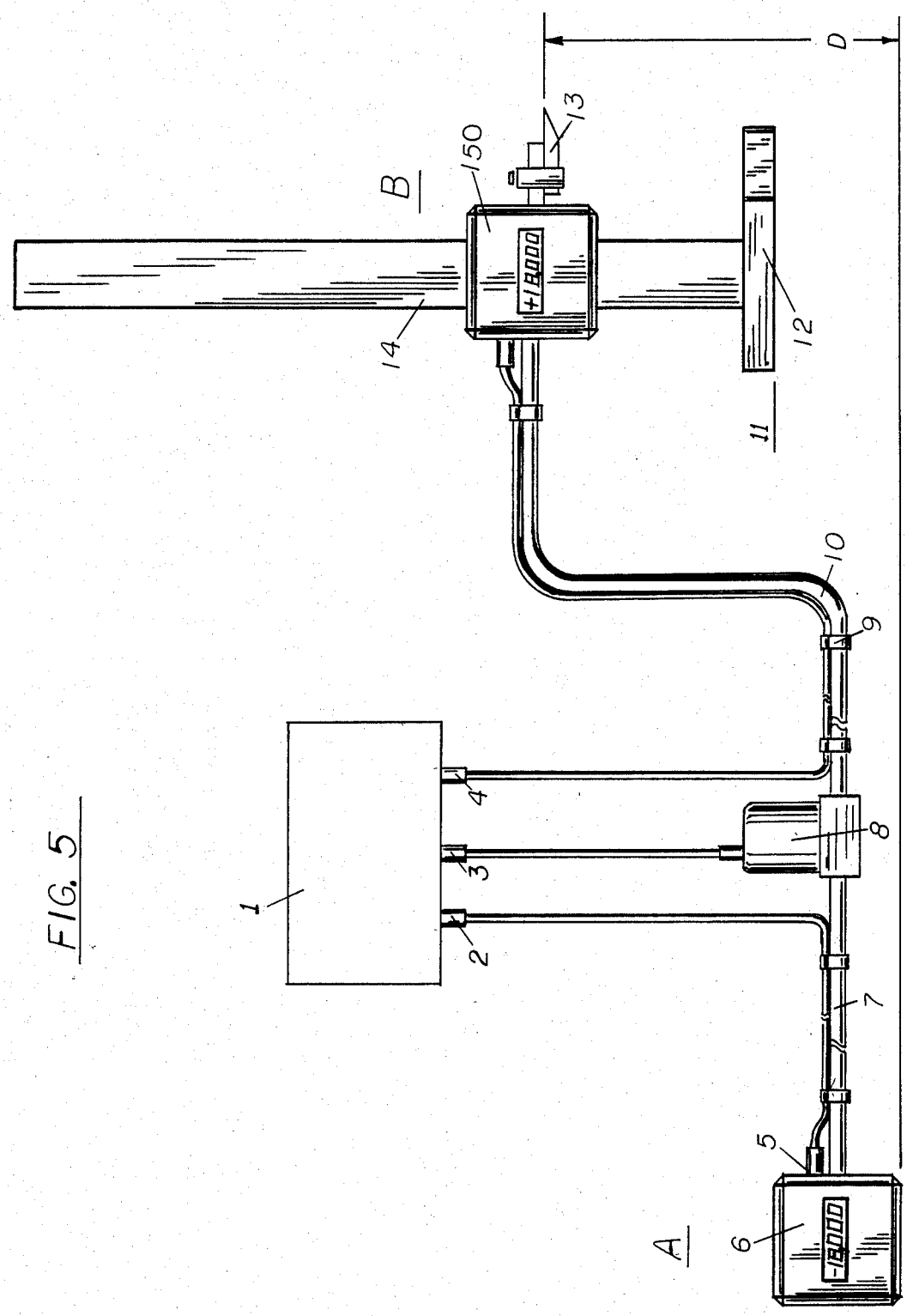

PRESSURE SENSITIVE LEVELING DEVICE

BACKGROUND OF THE INVENTION

1. Field of the Invention

This invention relates to a leveling device wherein a pressure sensor is disposed in each of two regions of a fluid filled, flexible conduit means. A differential in fluid pressure between the two sensors is detected by a digital voltmeter coupled to the sensors and the voltmeter is operable to indicate the elevation of one end of the conduit relative to the other end.

2. Description of the Prior Art

Various types of liquid leveling devices have been utilized throughout the history of man. For example, the builders of the ancient pyramids reportedly used a series of water filled, shallow trenches that were excavated in interconnecting, grid-like pattern. Once the level of water was stabilized within the trenches, were then leveled to a uniform height by reference to the height of water in the adjacent trenches.

Another type of fluid leveling device comprises a pair of open topped, identical containers that are partially filled with water. An elongated, flexible hose is coupled at each end to a port disposed on a lower portion of each of the containers so that communication of the fluid between the containers is established. Thus, a difference in elevation between the two containers can be roughly determined by measuring the distance from the top of the first container downwardly toward the upper surface of the water and then subtracting this value from the distance between the top of the second container and the water level in the second container. Unfortunately, several disadvantages are inherent to such a leveling device. For instance, excess water within the containers will overflow the lower container if the upper container is raised above a certain level. Also, the water may be spilled if either container is accidentally tilted, causing work interruption. Moreover, after one of the containers is moved, a considerable time may be required to wait for the water to flow through the hose and stabilize at identical levels in both containers. Furthermore, accurate measurement of the top of the liquid level is somewhat awkward even when some type of float is utilized. Finally, the meniscus effect of the water at the sidewalls of the container can produce inaccuracy of measurement especially when the sidewalls of both containers are wetted unequally. Obviously, it would be a desirable advance in the art if a means were provided to overcome the problems associated with such prior art devices.

SUMMARY OF THE INVENTION

The present invention advances the state of the art by provision of a novel enclosed conduit means which interconnects a pair of freely-movable members of pressure cells. In one form of the invention, a pressure sensor is coupled to each of the cells in disposition for communication with the conduit means, and the two sensors are operable to detect a fluid pressure differential in the conduit between the cells. The sensors transmit an electrical signal to an indicating means to provide a visual display of the elevation of one of the cells relative to the other.

In alternate forms of the invention, the conduit means inludes a first closed conduit coupled to one of the cells and a second closed conduit coupled to the other cell wherein the first conduit is in non-communicatin with the second conduit. Remote from the cells, each of the conduits are secured to a central structure having a thin, flexible diaphragm which communicates, on opposite sides, with each of the conduits. The diaphragm carries a pair of strain gauges operably coupled to a differential amplifier that in turn is connected to a voltmeter. The strain gauges transmit a signal to the amplifier in direct proportion to the pressure of the fluid within each of the compartments. Thus, if one of the containers is moved to an elevation with respect to the other container, the pressure in the compartment corresponding to the elevated container will be raised and the pressure in the compartment corresponding to the lowermost container will be reduced such that the diaphragm will undergo flexure and transmit a signal to the differential amplifier proportional to the amount of flexure. The strain gauges can be of the full bridge type and the differential amplifier can be tuned so that a one inch differential in water pressure is equal to one decimal inch on a digital voltmeter. Therefore, the height of the elevated chamber can be determined directly in inches by reference to the voltmeter.

In certain embodiments of the invention, portions of the conduit means are comprised of flexible tubing. The conduit also includes a variable volume chamber having a bellows structure to allow for expansion of the fluid due to thermal effects or accidental compression of part of one of the flexible tubing portions. Thus, if the tubing is unintentionally compressed by a vehicular tire or a worker's foot, then the bellows structure can expand to avoid accidental damage of the leveling device.

In other forms of the invention, the bellows structure is provided with an agitating means to reduce hysteresis of the fluid within the conduit means. The agitating means comprises a metallic armature coupled to the bellows and the armature oscillates the bellows in response to the passage of current through an adjacent coil. As a result, the agitating means is operable to quickly stabilize the fluid pressure between the two sensors such that an accurate measurement of any elevational difference between the two cells is thus provided.

In another embodiment, one of the pressure cells is mounted on an upright post for selective, reciprocable movement along an upright axis to any of a number of preselected positions. The slidable cell includes a workpiece engageable pointer to establish a point of reference for accurately determining the height of an adjacent workpiece.

BRIEF DESCRIPTION OF THE DRAWINGS

FIG. 3 is a fragmentary plan view of another form of the leveling device of the instant invention;

FIG. 4 is a fragmentary, side sectional view of the invention shown in FIG. 3; and FIG. 5 is a side elevational view of another form of the instant invention.

DETAILED DESCRIPTION OF THE DRAWINGS

Figure 2:
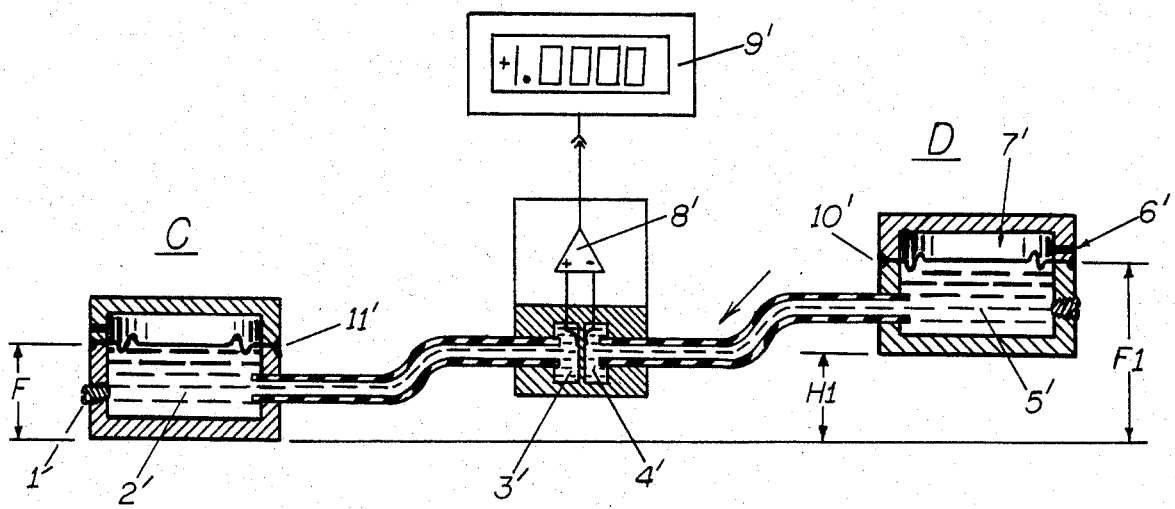
FIG. 2 is an illustration of one embodiment of the instant invention and is shown partly as a side cross-sectional view and partly in schematic form.

In one form of the leveling device of the instant invention as shown in FIG. 2, a first member or container C and a second member or container D both include a thin metallic cover 10', 11' to contain a fluid at 2', 5' such as water, hydraulic fluid, oil or any compatible fluid. Both of the containers C, D have a vent 6' (shown at container D) which communicates an air chamber (as at 7') to the atmosphere. A means interconnecting the container C and the container D and permitting selective movement of the container D to an elevated position relative to the container C comprises an enclosed conduit means having a first conduit associated with the container C and a second conduit associated with the container D, and the first and second conduit both carry the aforementioned fluid. The conduit means includes the areas adjacent the lead lines corresponding to the numerals 2', 5'. The interconnecting means couples each of the containers C, D to a central structure which includes chambers 3', 4'. A means associated with the conduit means for sensing fluid pressure at a first region in said first conduit and a second region in said second conduit comprises a pressure sensor such as a strain gauge disposed in each of the chambers 3', 4' which, in turn, is electrically coupled to a differential amplifier 8' that is coupled to a volt meter 9'. Both of the strain gauges are mounted on opposite sides of a thin, flexible diaphragm which is disposed intermediate the chambers 3', 4'. In operation, if the container D is elevated to a height H1 above the container C, then the fluid pressure in chamber 4' will be greater than the fluid pressure in 3' such that the diaphragm will flex and effect a readout on the volt meter 9'. Provision of a completely enclosed conduit means containing the fluid precludes accidental spillage, evaporation, or loss of fluid by other means.

Referring now to FIG. 4, the leveling device 70 in accordance with another embodiment of the invention comprises a first member or pressure cell H and a second member or pressure cell K. A conduit means, broadly designated by the numeral 71, interconnects the first cell H and the second cell K for selective movement of the second cell K to an elevated position relative to the position of the first cell H. A fluid 72, such as water, oil hydraulic fluid or any compatible fluid, is disposed in the conduit means 71.

A first sensing means, such as illustrated strain gauge 73 communicates with the conduit means 71 for detecting the pressure of the fluid 72 in the conduit means 71 at the first region adjacent the first cell H within a compartment 24. As shown, a thin, flexible stress diaphragm 22 separates the compartment 24 from the strain gauge 73.

In similar fashion, a second sensing means, such as illustrated strain gauge 44, is in communication with the conduit means 71 for detecting the pressure of the fluid 72 in the conduit means 71 at a second region within a compartment 41 adjacent the second cell K. Also, a thin, flexible stress diaphragm is disposed between the strain gauge 44 and the compartment 41.

As indicating means, including a LED indicator 16 connected to the first pressure cell H and a LED indicator 74 connected to the second pressure cell K, is operably associated with the first sensing means or strain gauge 73 and the second sensing means or strain gauge 44 for indicating the elevation of the second cell K relative to the position of the first cell H in response to a differential in fluid pressure between the first region with the compartment 24 and the second region within the compartment 41.

In more detail, the first cell H includes a base 21 that is sealingly connected to a box-like cover 17. The upper portion of the cover 17 supports a lens 15 adjacent the LED 16. A body 20 is received within a recess in the base 21 and includes structure for forming the compartment 24. A cap 19 fixedly engages an upper surface of the body 20 and forms a cavity 75 adjacent the strain gauge 73. The cavity 75 is hermetically sealed and retained at a subatmospheric pressure.

A pair of wires 18 are electrically coupled to the strain gauge 73 and pass through the cap 19 and a waterproof electrical connector 26 which is sealingly coupled to the cover 17. Also, a set of wires 27 passes through the connector 26 and is operatively coupled to the LED 16.

A reservoir assembly J is coupled to the fluid conduit means 71 intermediate the pressure cells H, K. The reservoir assembly J includes a normally lowermost, rectangular manifold 33 that has a raised portion which threadably and sealingly engages a cover 28. The reservoir assembly J also includes bellows structure 36 which is connected to a cap 35 having threads which engage a complementally-threaded orifice in the manifold 33. Also a top 38 is secured to an upper portion of the bellows structure 36 to form a variable volume chamber 32 as part of the conduit means 71. The reservoir 32 communicates with the remaining portions of the conduit means 71 by means of a channel disposed along a central axis of the cap 35.

A means associated with the bellows structure 36 for reducing the hysteresis of the fluid 72 within the conduit means 71 comprises an agitating means 76 including a metallic armature 37 secured to the top 38 by means of a bleeder screw 39. Additionally, the agitating means 76 includes a coil 31 surrounding the armature 37 and the coil 31 is operatively connected to a pair of wires 30 which extend through the cover 28 within a waterproof electrical connector 29.

The pressure cell K is identical to the pressure cell H and hence the detailed description presented hereinabove need not be fully repeated. Generally, the pressure cell K includes a base 42, the compartment 41, a vacuum cavity 43, the strain gauge 44, and a waterproof connector 45 through which wires from the strain gauge 44 and the LED 74 extend. A seal 63, such as an O-ring or the like, is disposed between the body and the base 42, identical to a similar seal (unnumbered) in the pressure cell H.

The conduit means 71 includes a fitting 25 which threadably engages the base 21 and a flexible, tubular portion 54 (FIG. 3). A fitting similar to the fitting 25 is coupled to the manifold 33 of the reservoir J on the opposite end of the flexible portion 54. Likewise, a flexible portion 50 is connected at each end to a threaded fitting which respectively engages the reservoir assembly J and the second pressure cell K. A pair of bleeder plugs 23, 40 are disposed adjacent the conduit means 71 in the bases 21, 42 of the pressure cells H, K respectively.

FIG. 3 illustrates the leveling device 70 of FIG. 4 in plan view, wherein it will be seen that the cover 17 of the first pressure cell H has a top surface 60 and the cover of the second pressure cell K has a top surface 46. The cover 28 of the reservoir assembly J has a round, top surface 51 while the manifold 33 has a rectangular surface 52 adjacent the raised, circular portion which threadably engages the cover 28. The sides of the manifold 33 of the reservoir assembly J are represented by the numerals 49, 62, and the upper surfaces of the connectors 26, 29, 45 are shown at the lead lines corresponding to the numerals 55, 53 and 48 respectively. It should also be obvious by reference to FIG. 3 that the distance represented by the letter N between the first pressure cell H and the reservir assembly J may be of any convenient length, and similarly the distance N1 between the reservoir assembly J and the second pressure cell K may also be of any practical dimension.

Referring now to FIG. 5, there is shown another form of the invention wherein a first sensing means or pressure cell 6 is connected by tubing 7, 10 to a second sensing means or pressure cell 150. A means mounting the second pressure cell 150 for selective, reciprocable movement along an upright axis comprises an elongated, generally upright post 14 that is slidably coupled to the second pressure cell 150. The tubing 10 is of sufficient flexibility to permit movement of the second pressure cell 150 to anyone of a number of preselected positions. The second pressure cell 150 also includes an outwardly extending, workpiece engageable scriber or pointer 13. The post 14 is coupled to a base 12 located at an elevation referenced by the numeral 11. In the embodiment of FIG. 5, a reservoir assembly 8 is coupled to the tubings 7, 10 and also to a differential amplifier 1. Electrical connectors 2, 3 and 4 interconnect wires from the pressure cells 6, 150 and the amplifier 1. An electrical connector 5 interconnects the wire between the amplifier 1 and the first pressure cell 6, while connectors such as a strap 9 secure the electrical wires to a position adjacent the tubings 7, 10. In other respects, the operation of the pressure cells 6, 150 is identical to the operation of the pressure cells H, K as described with reference to the embodiment shown in FIGS. 3-4.

The differential amplifier 1 as seen in FIG. 5 functions identically to a differential amplifier (not shown) utilized in the embodiment illustrated in FIGS. 3-4. More particularly, the differential amplifier is operable to receive an electrical signal from the full bridge strain gauges 44, 73 and consequently display a readout, as indicated by the lead lines corresponding to the numerals 47, 61 (FIG. 3). Preferably, the amplifier includes variable resistors for adjusting the balance of the signal received from the strain gauges 44, 73 and also includes a span adjustment means for corresponding a given pressure differential in inches to the elevational difference between the pressure cells H, K. Also, a filter is provided which is operable to remove a 60 cycle per second pulse received from the agitating means 76.

In operation, the leveling device 70 as shown in FIGS. 3-4 is operable to sense a pressure differential between the pressure of the fluid on the strain gauge 44 and the strain gauge 73. Thus, if the pressure cell K is elevated to a distance Z (FIG. 3) above the pressure cell H, wherein Z is equal to one inch, then the readout at 47 incidates +1.0000 while the readout 61 at the pressure cell H indicates a −1.0000. Similarly, the leveling device 70 may be utilized as shown in FIG. 4 wherein the pressure cell K is elevated relative to the pressure cell H but in a different plane than is depicted in FIG. 3. The sides of the cells H, K as well as the normally lowermost bottom portions of the bases 21, 42 include generally flat surfaces for convenient, accurate engagement with a workpiece. Noteworthy also is the fact that the numeral value of the readout 61 is identical but opposite in sign to the readout 47.

It is also possible to utilize the leveling device 70 in such a fashion wherein the pressure cells H, K are disposed in a common horizontal plane and a reservoir assembly J is shiftable along an upright axis. In this use, both the sign and the numeric value of the readout 61 will be identical to the sign and value of the readout 47.

The agitating means 76 positioned within the reservoir assembly J is operable to reduce hysteresis of the fluid 72 within the conduit means 71 by means of the coil 31 which oscillates the metallic armature 37 at preferably a frequency of 60 cycles per second. The bellows structure 36 is laterally shiftable so that the 60 cps pulse is thus transmitted to all portions of the conduit means 71. The pressure pulse agitates the fluid 72 so that the strain gauges 44, 73 quickly respond to a change in fluid pressure as either of the pressure cells H, K or the reservoir assembly J are vertically shifted.

The bellows structure 36 also is expandable to vary the volume within the chamber 32. Thus, if either of the flexible tubing portions 50, 54 are stepped on or otherwise compressed, the bellows structure 36 will expand to preclude damage to the conduit means 71. Alternatively, the bleeder plugs 23, 40 may be provided wtih spring loaded pressure relief valves.

The pressure pulse produced by the agitating means 76 is detected by both of the strain gauges 44, 73 and subsequently is transmitted to the differential amplifier as a 60 cps sine wave. However, this sine wave is filtered out so that the LEDs 16, 74 receive only a steady DC signal. Generally speaking, the agitating means 76 is particularly useful on leveling devices where longer lengths (over 100 feet) of tubing is employed.

As should now be obvious to one skilled in the art, the leveling device 70 as shown in FIGS. 3-4 substantially reduces the probability of erroneous elevational measurements. If either of the flexible tubing portions 50, 54 are stepped on or otherwise compressed, then the resulting pressure fluctuation in the conduit means 71 will be detected equally by both of the strain gauges 44, 73 and hence cancelled out by the differential amplifier. Alternatively, if the sun or other means heats the fluid 72 within the tubing 50 causing thermal expansion of the contained fluid 72, such expansion cannot alter the readout 61, 47.

One of many possible applications of the instant invention involves use of the leveling device 70 in an airplane to determine the amount of ice buildup on the wings before takeoff. In this application, the reservoir assembly J would be positioned at the center of the fuselage, while each of the pressure cells H, K would be located near the outward ends of opposite wing tips. As ice builds up on the wings, the tips will deflect downward toward the ground in direct proportion to the additional weight, and such deflection will be sensed by the strain gauges and indicated by the LEDs. Safe weight limits on the wings can be calculated and compared to the LED readouts.

In the operation of the embodimets shown in FIG. 5, the first pressure cell 6 remains substantially in a fixed position while the second pressure cell 150 is selectively moved along the upright post 14. As illustrated, positioning of the pointer 13 at an elevation D above the lowermost surface of the first pressure cell 6 corresponds to a reading of +18.000 on the second pressure cell 150 and an opposite value of −18.000 on the first pressure cell 6.

Figure 1:
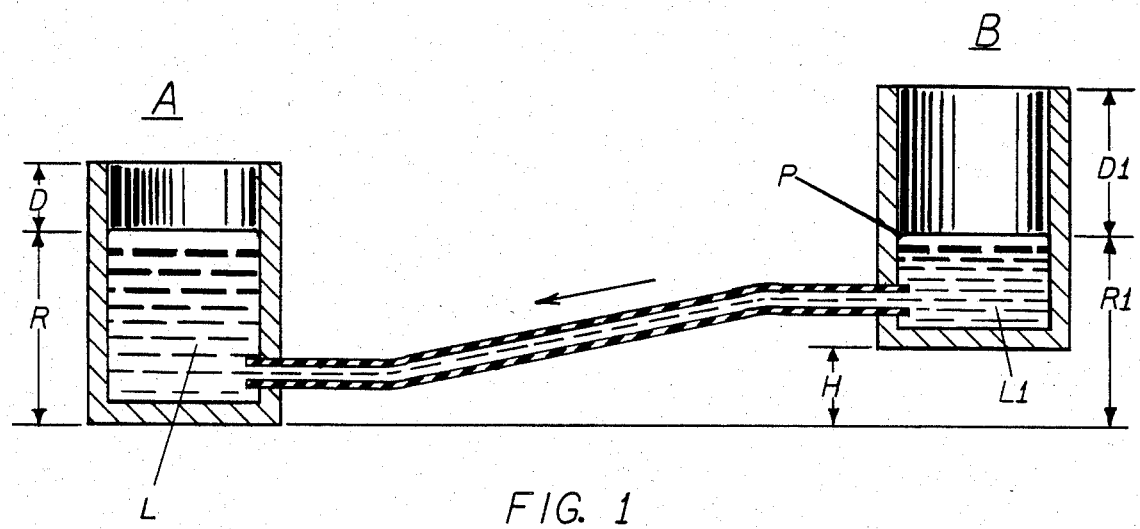
FIG. 1 is a side cross-sectional view of a prior art leveling device.

FIG. 1 represents a view of a typical prior art manual measuring device. If the container B is elevated a distance H above the container A, then the distance H may be calculated by subtracting the distance D from the distance D1. As should be obvious, the disadvantages of such a system include the dangers of either accidentally tilting the containers A, B or overflowage of the liquid if the container B is lifted above a certain height. Moreover, the distances D, D1 are in practice somewhat difficult to accurately obtain.

I claim:

1. A leveling device comprising:
   at least a first cell member and a second cell member;
   conduit means interconnecting said first cell member and said second cell member and permitting selective movement of said second cell member to an elevated position relative to the position of said first cell member;
   a fluid disposed in said conduit means;
   first sensing means associated with said first cell member and communicating with said conduit means for detecting the pressure of said fluid in said conduit means at a first region adjacent said first cell member;
   second sensing means associated with said second cell member and conduit means for detecting the pressure of said fluid in said conduit means at a second region adjacent said second cell member; and
   means substantially insensitive to pressure fluctuations in said conduit means caused by sources external to said device and operably associated with said first sensing means and said second sensing means for indicating the elevation of said second cell member in response to a differential in fluid pressure between said first region and said second region.

2. The invention of claim 1, wherein said conduit means includes a chamber having a variable volume.

3. The invention of claim 2, wherein said chamber includes a bellows structure.

4. The invention of claim 3; and including means associated with said bellows structure for reducing the hysteresis of fluid within said conduit means.

5. The invention of claim 4, wherein said means for reducing fluid hysteresis comprises an agitating means.

6. The invention of claim 1, wherein said second member includes a normally lowermost planar surface engageable with a workpiece.

7. The invention of claim 1; and means mounting said second member for selective, reciprocable movement along an upright axis to any one of a number of preselected positions.

8. The invention of claim 7, wherein said second member includes a workpiece-engageable pointer.

9. The invention of claim 1, wherein said conduit means includes flexible tubing portions.

10. The invention in claim 1, wherein said conduit means connecting said first cell and said second cell are in communicating relationship.

11. A leveling device comprising:
    at least a first cell member and a second cell member;
    means interconnecting said first cell member and said second cell member permitting selective movement of said second cell member to a different elevational position relative to the position of said first cell member;
    said interconnecting means including a conduit means having a first conduit associated with said first cell member, said conduit means also having a second conduit associated wtih said second cell member, said first conduit being in communication with said second conduit;
    a fluid disposed in said first and second conduits;
    a first diaphragm mounted pressure sensor associated with said first conduit means for sensing fluid pressure at a first region in said first conduit;
    a second diaphragm mounted pressure sensor associated with said second conduit means for sensing fluid pressure at a second region in said second conduit,
    said first region being adjacent to said first member, and said second region being adjacent said second member and remote from said first member; and
    means operably associated with said first and second pressure sensors for indicating the elevational position of said second member in response to a differential in fluid pressure betwen said first region and said second region.

* * * * *